United States Patent [19]

Kaufholz, Jr.

[11] 4,092,689
[45] May 30, 1978

[54] CARTRIDGE EJECTING MECHANISM

[75] Inventor: Frank H. Kaufholz, Jr., Havertown, Pa.

[73] Assignee: Computer Peripherals, Inc., Rochester, Mich.

[21] Appl. No.: 742,029

[22] Filed: Nov. 15, 1976

[51] Int. Cl.² ............................ F16C 1/10; F16C 1/16
[52] U.S. Cl. ................................. 360/137; 74/100 R; 74/501 R; 74/501 P; 74/501 M
[58] Field of Search ............ 360/137; 74/100, 501 R, 74/501 P, 501 M

[56] References Cited

U.S. PATENT DOCUMENTS

| | | | |
|---|---|---|---|
| 3,067,623 | 12/1962 | Kinderman | 74/100 |
| 3,093,162 | 6/1963 | Reiling | 74/501 P |
| 3,429,197 | 2/1969 | Lowenstern | 74/501 P |
| 3,552,229 | 1/1971 | Cummins | 74/501 M |
| 4,017,900 | 4/1977 | Katsurayana | 360/137 |
| 4,017,902 | 4/1977 | Sato | 360/137 |

OTHER PUBLICATIONS

*Automotive Industries*, 12/64 p. 26, Remote Control Mirror.

Primary Examiner—Jay P. Lucas
Attorney, Agent, or Firm—J. T. Cavender; Wilbert Hawk, Jr.; Richard W. Lavin

[57] ABSTRACT

A cartridge eject mechanism is disclosed for ejecting a cassette tape cartridge from a tape recorder or the like. The eject mechanism comprises a pre-formed non-linear elastic slide member mounted in a housing with one end positioned adjacent the tape cartridge while the other end supports an actuating member. Depression of the actuating member forces the slide member through the housing to eject the cartridge. Portions of the slide member, in moving through the housing, are forced out of their normal shape by the configuration of the housing thereby generating forces to return the slide member to its original shape. Upon release of the actuating member, these forces, in restoring the actuating member to its original shape, will move the slide member through the housing to its home position.

14 Claims, 3 Drawing Figures

CARTRIDGE EJECTING MECHANISM

BACKGROUND OF THE INVENTION

In present day cassette tape transports in which reels of tape are utilized for memory storage, ejecting devices have been employed to facilitate the removal of the cassette from the tape transport to allow such removal of the cassette to occur in the minimum amount of time and to prevent damage to the cassette that might occur if the cassette is manually removed. Prior ejecting devices have utilized complex and costly mechanism thereby adding to the cost of the tape transport. It is therefore an object of this invention to provide an ejecting mechanism for use in a cassette tape transport which is simple in operation and construction and therefore low in cost. It is another object of this invention to provide an ejecting mechanism which will automatically return to its home position after an ejecting operation without requiring the use of a return spring or the like. It is a further object of this invention to provide an ejecting mechanism which is constructed of a minimum number of parts and which requires no adjustment to sustain its operation.

SUMMARY OF THE INVENTION

These and other objects and advantages of the invention are fulfilled by slidably mounting an elongated ejecting member within a housing secured to the deck of a tape transport. The ejecting member and the housing are constructed with similar co-extensive rectilinear and semi-circular portions. One end of the ejecting member is positioned adjacent the lower surface of the cassette while the other end, on which is mounted an actuating member, extends upward from the tape deck. Depression of the actuating member slides the ejecting member, which is constructed of an elastic material, through the housing to allow the other end of the ejecting member to engage and eject the cassette cartridge from its position on the tape deck. Movement of the ejecting member will position the rectilinear portion of the ejecting member within the semi-circular portion of the housing and the semi-circular portion of the ejecting member within the rectilinear portion of the housing, thereby forcing the portions of the ejecting member to take a shape which is contrary to its normal shape. When this occurs, reactionary forces are set up in the ejecting member to return the ejecting member to its home position upon release of the actuating member.

DESCRIPTION OF THE PREFERRED EMBODIMENT

Figure 1:
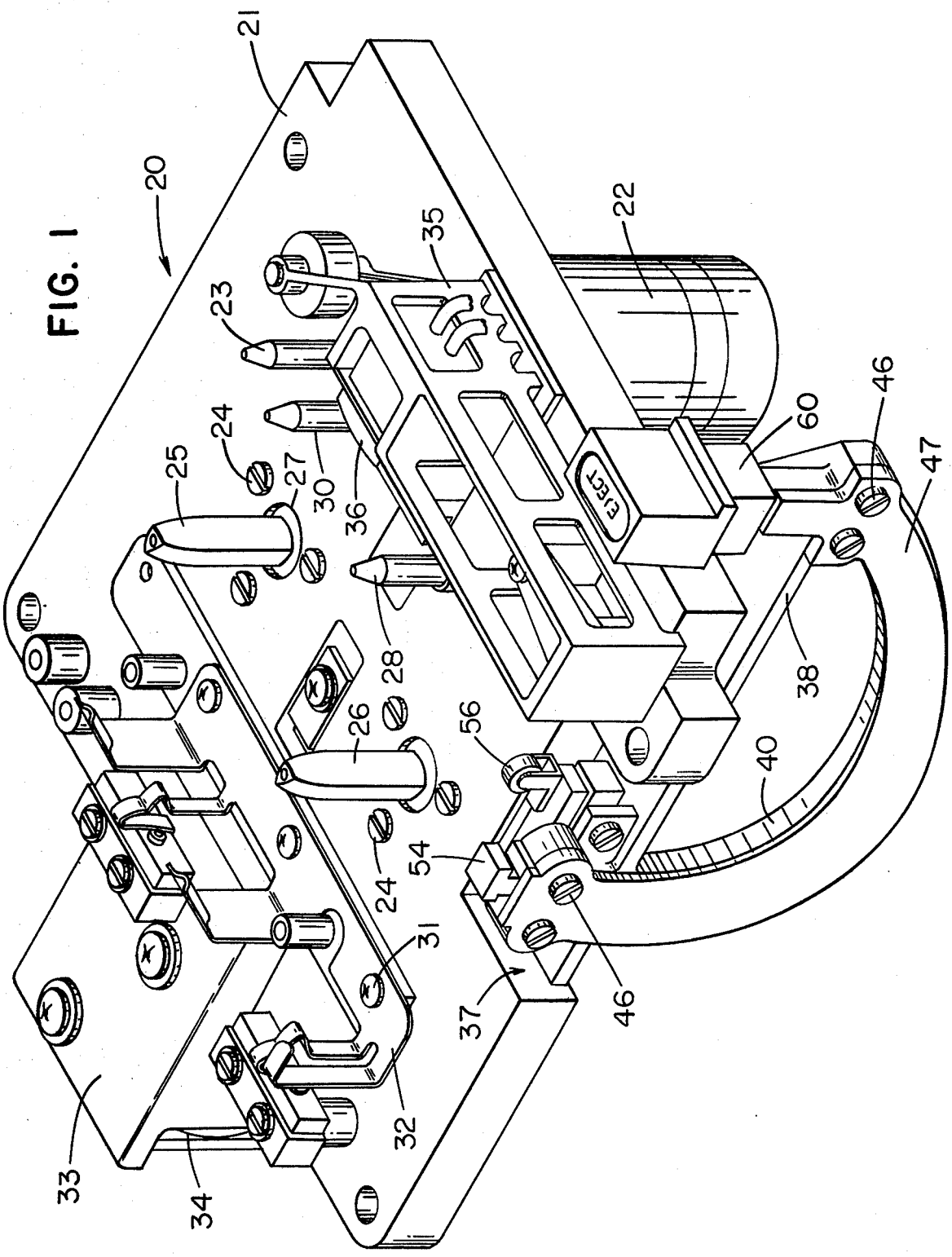
FIG. 1 is an oblique view of the tape transport showing the mounting of the ejecting mechanism on the transport.

Referring to FIG. 1, there is shown a cassette tape transport designated generally by the reference number 20 and which includes a deck plate 21 to the underside of which is mounted by any suitable means a capstan drive motor 22 with its associated drive member 23 extending through an aperture (not shown) in the deck plate 21. Also secured to the underside of the deck plate 21 by any suitable fastening means, such as screws 24, are the take-up and drive motors (not shown) with their attending take-up spindle 25 and drive spindle 26 extending through apertures 27 located in the deck plate 21. As further shown in FIG. 1, secured to the top of the deck plate 21 is a pair of guide pins 28, 30 for locating the cassette on the deck plate 21 in a manner well known in the art. Also secured to the deck plate 21 by means of screws 31 is a locating bracket 32 for positioning the cassette on the deck plate and a housing 33 for supporting a solenoid 34 which moves a transducer head support member 35 in a direction to move a transducer head 36 into engagement with the magnetic tape located in the cassette. The construction and operation of the support member 35 is disclosed in the co-pending U.S. application Ser. No. 606,636 now U.S. Pat. No. 4,005,492 and which is assigned to the assignee of the present application.

Located in a cut-out area 37 of one side of the deck plate 21 is the cassette ejecting mechanism of the present invention, which includes a laterally extending support plate 38 secured to the underside of the deck plate 21 by any suitable fastening means such as screws or the like (not shown). Formed as part of the plate 38 is one side of a housing member 40 which extends in a semi-circular direction from the front edge of the plate 38 adjacent the support member 35 to the rear edge of the plate 38. As shown more clearly in FIGS. 2 and 3, a guide slot 41 extends lengthwise along the housing member 40 and terminates in a front 42 and rear 43 portion of the guide housing 40, each of which extends upwardly in a vertical direction from the plate 38. Formed in the vertical portions 42, 43 of the housing member 40 are restrictions 44, 45 respectfully which reduce the guide slot 41 at these points to a predetermined width which, as will be described more fully hereinafter, functions to facilitate the movement of the ejecting member to its home position. As shown in FIG. 1, secured to the guide housing 40 by any suitable fastening means such as screws 46 is a cover plate 47 for enclosing the slot 41.

Figure 2:
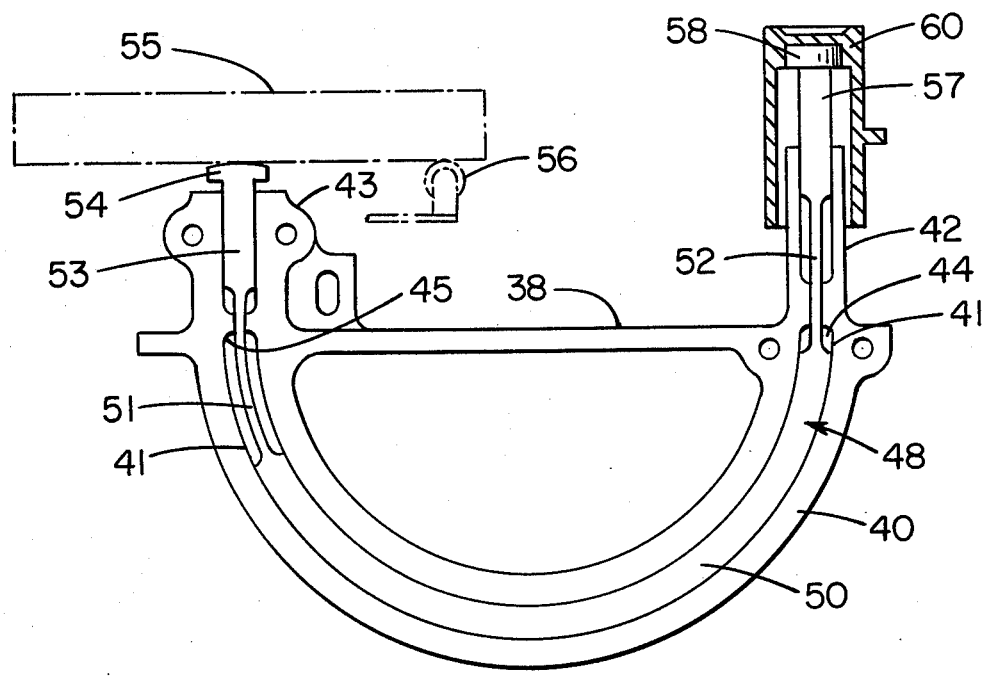
FIG. 2 is a side detailed view of the ejecting member mounted within the housing, with one side of the housing removed and showing the ejecting member in its home position.
Figure 3:
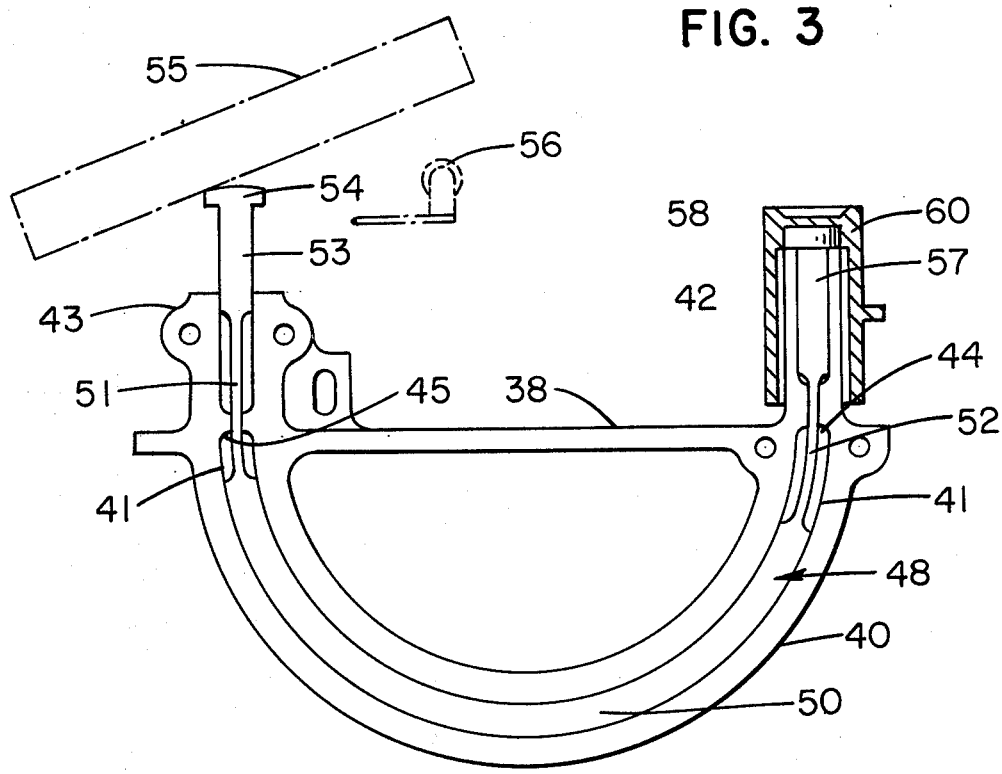
FIG. 3 is a view similar to FIG. 2 showing the ejecting member moved to its cassette ejecting position.

As shown in FIGS. 2 and 3, slidably positioned within the guide slot 41 is an ejecting member comprising an actuator slide generally indicated by the reference number 48 and constructed of any suitable type of an elastic material. An example of a material that may be used is "DELRIN", a trademark of the E. I. DuPont de Nemours Co. which has the elastic property of returning to its original shape when deformed by externally applied forces. Another example of an elastic material that may be utilized is spring steel which can be formed to provide the required elastic movement. The slide 48 is formed generally in a shape which is coextensive with the shape of the slot 41. Thus, the slide 48 is formed with an intermediate portion 50 which is rigid in construction having a semi-circular shape and which conforms to the shape of the intermediate portion of the slot 41, and with a pair of flexible portions 51, 52 each of which has a width to slidably fit within the restrictions 44, 45 of the slot 41. The cross-sectional configuration of the middle portion 50 of the slide 48 is circular while that of the flexible portions 51, 52 is rectangular — with the interior configuration of the slot 41 and the restrictions 44, 45 conforming to such dimensions.

Referring to FIG. 2, where the slide 48 is shown in its home position, the flexible portion 51 of the slide 48 is formed in a semi-circular shape within the slot 41 while the opposite flexible portion 52 is formed in a linear shape and which extends in a vertical direction within the front vertical portion 42 of the housing member 40. The rear end 53 of the actuator slide 48 extending from the portion 43 of the housing member 40 has formed thereon a head contact portion 54 normally positioned adjacent the lower surface of the tape cassette 55 (FIG. 2) The cassette 55 is normally positioned on a sensing member 56 (FIGS. 1 and 2) secured to the support plate 38 and which senses the presence or absence of the cassette on the tape transport. The front end 57 of the actuator slide 48 has formed thereon a support portion 58 on which is mounted an actuator button 60 which, as shown in FIG. 1, extends above the deck plate 21. As illustrated, the support portion 58 coacts with the top edge of the vertical portion 42 of the housing member 40 to limit the movement of the slide 48 in the ejecting direction.

In operation, depression of the button 60 will move the actuator slide 48 through the guide slot 41 resulting in the head contact portion 54 of the slide rocking the cassette 55 in the bracket 32 (FIG. 1) to a position (FIG. 3) which facilitates its removal from the tape transport. As shown, such movement of the slide 48 from its home position (FIG. 2) to its eject position (FIG. 3) results in the formed curved portion 51 of the slide 48 being deformed by the restriction 45 so as to assume a linear shape while the linear portion 52 of the slide 48 is deformed by the restriction 44 to assume a curved shape. Both of these deformations produce forces within the portions 51 and 52 of the slide 48 acting to return the slide to its original shape such that upon release of the button 60 by the operator, the slide 48 will automatically return to its pre-formed shape by moving to its home position (FIG. 2) within the slot 41, such action occurring within a minimum amount of time. Thus, it is seen that the ejecting mechanism of the present invention will provide an ejecting operation which requires no auxiliary springs or the like to return the actuator slide 48 to its home position. And since the housing 40 may be constructed of a plastic material in addition to the actuator slide 48, it is further seen that the cost of the present ejecting mechanism is minimal.

While there has been described a form of the invention and its mode of operation, it will be apparent to those skilled in the art that changes may be made in the apparatus described without departing from the spirit and scope of the invention as set forth in the appended claims and that in some cases, certain features of the invention may be used to advantage or modified without corresponding changes in other features, while certain features may be substituted for or eliminated as appreciated by those skilled in the art. Thus, while the actuator slide 48 has been disclosed as having preformed reduced portions 51 and 52 which flex to produce the forces that return the slide to its home position upon release by the operator, it is obvious that the actuator could be formed having the same width throughout its length and still function in the manner as described and claimed in the present application. In this connection, the width of the slot 41 would be required to be uniform throughout its length to accommodate the slide.

What is claimed is:

1. An ejector mechanism comprising
   (a) support means positioned adjacent a movable member;
   (b) an open-ended slot located within said support means having one end in communication with the movable member, the slot having linear and non-linear portions;
   (c) and an actuator member formed of an elastic material to be coextensive with said slot when in a home position and having corresponding linear and non-linear portions, said actuator member slidably mounted within said slot for movement from a home position to an actuated position engaging and ejecting said movable member wherein the linear and non-linear portions of the actuator member are deformed by the corresponding linear and non-linear portions of the slot upon movement of the actuator member through the linear and non-linear portions of the slot, said deformed portions biasing the actuator member for a return movement to the home position within the slot.

2. The ejector mechanism of claim 1 in which the slot includes a reduced portion located between the linear and non-linear portions of the slot for coacting with the linear and non-linear portions of the actuator member to deform such portions upon movement of the actuator member to an actuated position.

3. The ejector mechanism of claim 1 in which the actuator member is formed of a plastic material.

4. The ejector mechanism of claim 1 in which the other end of the slot extends through said support means, said actuator member having one end positioned adjacent the movable member and its other end projecting outwardly from said slot other end of said support means whereby upon actuation of the other end of said actuator member, the one end of the actuator member is moved to an actuated position engaging and moving said movable member.

5. The ejector mechanism of claim 1 in which the non-linear portion of the slot extends in a circular direction.

6. The ejector mechanism of claim 4 which further includes a support portion extending outwardly from said support means and through which the slot extends and wherein the other end of the actuator member projects outwardly therefrom, said mechanism further includes a stop member positioned on the other end of the actuator member for engaging the said support portion upon movement of the actuator member toward an actuated position to limit the movement of the actuator member in such direction.

7. A mechanism for ejecting a tape cartridge from a transport mechanism including
   (a) a slot located within the transport mechanism having one end positioned adjacent the tape cartridge and the other end positioned away from the tape cartridge, said slot having linear and non-linear portions;
   (b) and a manually operable actuating member formed of an elastic material to be coextensive with said slot having corresponding linear and non-linear portions, said actuating member slidably mounted within said slot for movement from a non-actuated position to an actuated position engaging and ejecting the tape cartridge from the transport mechanism, wherein the linear and non-linear portions of the actuating member are deformed by the corresponding linear and non-linear portions of the slot upon movement of the actuator member through the linear and non-linear portions of the slot, said deformed portions biasing the actuating member for a return movement to the non-actuated position upon release of the actuating member from the actuated position.

8. The ejecting mechanism of claim 7 in which the slot includes a reduced portion positioned between the linear and non-linear portions of the slot for deforming the linear and non-linear portions of the actuating member upon movement of the actuating member to an actuated position.

9. The ejecting mechanism of claim 8 in which the actuating member includes a reduced linear portion and a reduced non-linear portion slidably engaging the corresponding reduced portions of the slot whereby upon movement of the actuating member to an actuated position, the reduced portions of the slot will deform the engaged reduced portions of the actuating member.

10. The ejecting mechanism of claim 8 in which the ends of the slot comprise the linear portions of the slot with the portion of the slot intermediate the ends of the slot comprising the non-linear portion of the slot whereby upon movement of the actuating member to an actuated position, the intermediate portion of the actuating member is moved into one end of the slot thereby being deformed by the linear portion of the slot to assume a linear shape while the linear portion of one end of the actuating member is moved into the intermediate portion of the slot to assume a non-linear shape wherein upon release of the actuating member, the deformed portions of the actuating member returning to their original shape thereby moving the actuating member to its non-actuated position.

11. The ejecting mechanism of claim 10 in which the intermediate portion of the slot extends in a circular direction.

12. The ejecting mechanism of claim 7 in which the actuating member is formed of spring steel.

13. The ejecting mechanism of claim 7 further including an elongated housing positioned adjacent the tape cartridge and having a support portion positioned away from the tape cartridge, said slot positioned within said housing with one end located adjacent the tape cartridge and its other end extending through said support portion, said actuating member having one of its ends projecting outwardly from the support portion when in a non-actuated position, said ejecting mechanism further including a stop member positioned on the end of the actuating member projecting from the support portion to engage the support portion upon movement of the actuating member to an actuated position thereby limiting the length of movement of the actuating member in the actuating direction.

14. A method for returning an actuator from an actuated position to a non-actuated position comprising the steps of:
 (a) forming an elongated actuator member from an elastic materal in a configuration having linear and non-linear portions;
 (b) mounting the actuator member in a non-actuated position within a slot in a housing member;
 (c) moving the actuator member through said slot to an actuated position;
 (d) deforming the linear and non-linear portions of the actuator member during movement of the actuating member to the actuated position;
 (e) and releasing the actuating member to allow the deformed portions of the actuator member to return to their non-deformed state wherein the actuating member is moved to its non-actuated position.

* * * * *